United States Patent
Levine (10) Patent No.: US 10,306,844 B1
(45) Date of Patent: Jun. 4, 2019

(54) METHOD AND APPARATUS FOR NETWORKED IRRIGATION CONTROLLERS THAT ADJUST WATERING SCHEDULES IN RESPONSE TO RAINFALL

(71) Applicant: Michael R. Levine, Pinckney, MI (US)

(72) Inventor: Michael R. Levine, Pinckney, MI (US)

( * ) Notice: Subject to any disclaimer, the term of this patent is extended or adjusted under 35 U.S.C. 154(b) by 0 days.

(21) Appl. No.: 15/851,955

(22) Filed: Dec. 22, 2017

(51) Int. Cl.
  A01G 25/16 (2006.01)
  G05B 19/042 (2006.01)
  H04W 52/02 (2009.01)

(52) U.S. Cl.
  CPC ......... *A01G 25/165* (2013.01); *G05B 19/042* (2013.01); *H04W 52/0216* (2013.01); *G05B 2219/2625* (2013.01)

(58) Field of Classification Search
  None
  See application file for complete search history.

(56) References Cited

U.S. PATENT DOCUMENTS

| | | | | |
|---|---|---|---|---|
| 4,423,484 A | * | 12/1983 | Hamilton | G05B 19/042 137/624.2 |
| 6,823,239 B2 | * | 11/2004 | Sieminski | A01G 25/167 239/69 |
| 2005/0107924 A1 | * | 5/2005 | Bailey | A01G 25/16 700/284 |
| 2009/0216345 A1 | * | 8/2009 | Christfort | G05B 19/0428 700/21 |
| 2018/0109094 A1 | * | 4/2018 | Paul | H02G 3/088 |

\* cited by examiner

*Primary Examiner* — Paul B Yanchus, III
(74) *Attorney, Agent, or Firm* — The Concept Law Group, P.A.; Scott M. Garrett; Scott D. Smiley (57) ABSTRACT

A method and apparatus for a networked irrigation system include a battery powered networked irrigation controller that communicates with a backend server. The backend server monitor rainfall at the location of the irrigation controllers via third party weather resources. General irrigation is set to commence once every several days, and when rain falls at the location of an irrigation controller, the watering schedule is shifted to ensure that watering does not occur more frequently than desired. The irrigation controller uses a cellular transceiver modem to communicate with the backend server, and since the irrigation controller is battery powered, the cellular transceiver modem is maintained in an off state until just prior to commencing a scheduled watering, when the irrigation controller contacts the backend server.

20 Claims, 8 Drawing Sheets

*FIG. 13* ed States Patent

US 10,306,844 B1

METHOD AND APPARATUS FOR NETWORKED IRRIGATION CONTROLLERS THAT ADJUST WATERING SCHEDULES IN RESPONSE TO RAINFALL

FIELD OF THE DISCLOSURE

The present disclosure relates generally to irrigation control, and more particularly to networked irrigation controllers that adjust watering schedules in response to rainfall.

BACKGROUND

There are a wide variety of applications in which irrigation control is used to ensure optimum watering of crops and landscaping. In general, irrigation is used to supplement natural rainfall, but frequently it is used in addition to rainfall, often leading to overwatering and therefore wasteful watering. The conservation of water supplies is of paramount concern, so it is of interest to not water when natural rainfall has occurred sufficient to meet the watering needs of a region for a given period.

Many manufacturers have designed systems that inhibit watering upon the occurrence of rain by using local sensors that measure rainfall or soil moisture. However these systems are prone to inaccurate readings and breakage of the sensor equipment. Furthermore, irrigation controllers typically require a commercial electric power source because of the frequent operation of circuitry. This limits the ease of deployment of irrigation controllers, or adds to the cost by requiring the laying of power lines to areas to be serviced by irrigation controllers.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Write claim 1 in sentence form.

Figure 1:
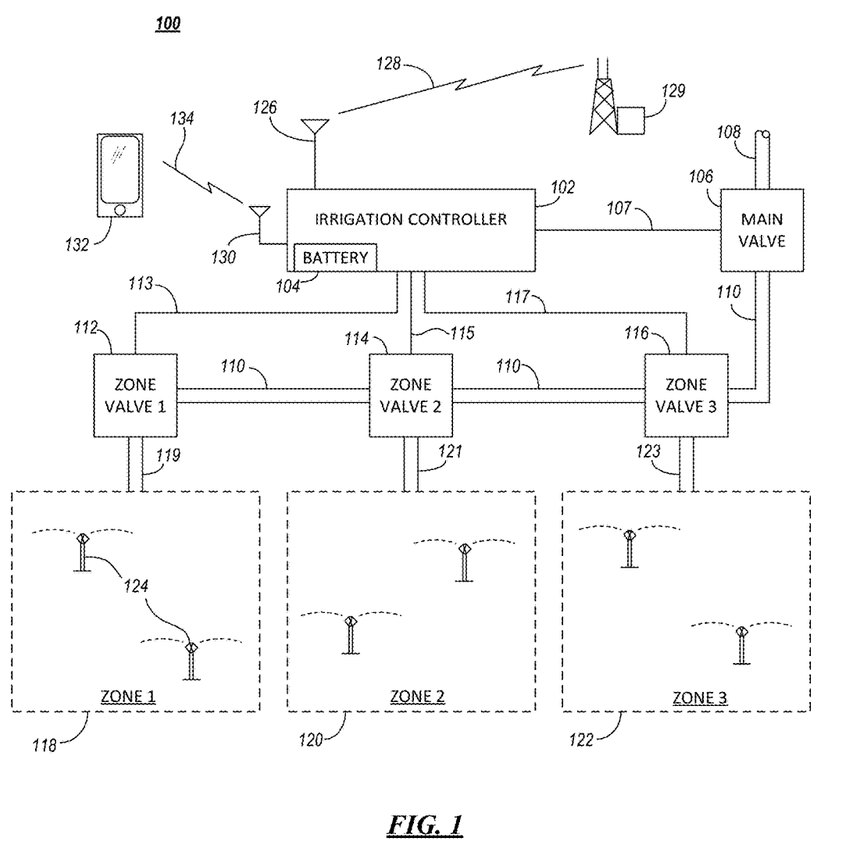
FIG. 1 is a deployment diagram for a battery powered networked irrigation controller, in accordance with some embodiments.

FIG. 1 is a deployment diagram 100 for a battery powered networked irrigation controller 102, in accordance with some embodiments. The irrigation controller is powered by a battery 104, which can be either a primary (non-rechargeable) or a secondary (rechargeable) battery. If a secondary battery is used, it can be recharged by a charging means (not shown) such as, for example, a solar to electric conversion unit, or a wind turbine generator. The irrigation controller is not powered by a commercial alternating current (AC) electric power source. By being free of a commercial AC source, the time and expense of routing wiring to the irrigation controller 102 is avoided, which can greatly simplify deployment of such irrigation controllers. The irrigation controller 102 controls irrigation or sprinkling operation in one or more nearby areas, referred to as zones, by opening and closing water valves according to a schedule or program set by a remote server that takes natural rainfall into account to avoid watering when rainfall has provided sufficient water.

Accordingly, to control watering, in some embodiments the irrigation controller can control a main valve 106 that is connected to a water source 108, such as, for example, a municipal water supply. The main valve controls the flow of water from the water source 108 to a distribution pipeline 110, which provides water to several zone valves 112, 114, 116, each of which are also controlled by the irrigation controller 102 via respective control lines 113, 115, 117. Each zone valve 112, 114, 116 controls irrigation within a respective zone 118, 120, 122, and is either opened and closed typically by a solenoid-controlled valve mechanism in each zone valve 112, 115, 116. Each zone is a geographic area that can have an arbitrary shape, although the zones are generally contiguous with, or adjacent each other. Each zone 118, 120, 122 contains one or more water distribution outlets 124 that project water over an area within the zone, and are connected to the zone valve 112, 114, 116 through respective zone piping 119, 121, 123. The water distribution outlets can be, for example, sprinkler heads, spray nozzles, and the like. The water distribution outlets 124 are connected to the distribution pipeline 110 through the corresponding zone valve 112, 114, 116 for the respective zone 118, 120, 122.

In general, the irrigation controller 102 enables watering in one zone at a time, according to a prescribed adjustable program, for a selected period of time. The frequency and duration of irrigation depends on the plant matter being watered. For example, many lawns are planted with particular grass types, and in soil such that watering once every several days is sufficient to keep the grass in good condition, once it is established. Zones are generally enabled, and then disabled, in series. So, for example, a typical watering program could be that zone 1 118 is enabled for 30 minutes of watering, and then disabled. Shortly after watering in zone 1 118 is disabled, then watering in zone 2 120 is then enabled for another 30 minutes, and so on, until all zones have been watered for their respective prescribed duration. Watering can be controlled to occur once every "n" days, where n is an integer from 1 to 7, in some embodiments. However, the scheduled, or programmed watering can be shifted by n−r days, when rainfall occurs, where "r" is the number of days since it last rained at the location of the irrigation controller. When rainfall is predicted to occur (with sufficient certainty) on a day on which watering is set to occur, r can be set to zero, and the next watering can then be set to occur in another n days.

Programming of the irrigation controller 102 occurs via radio networking, which can be accomplished by any of several ways. For example, the irrigation controller can include a cellular modem that transmits and receives radio signals via a cellular antenna 126. A cellular modem is a radio modem designed to operate according to any one of several well-known cellular telephony data communication protocols, such as, for example, Long Term Evolution (LTE) as standardized by the $3^{rd}$ Generation Partnership Project (3GPP), as is well known. Signals can be sent and received over a cellular radio channel 128 established with a cellular base site 129, which is further connected to a cellular infrastructure system, and to other networks, including the Internet, which allows the irrigation controller 102 to communicate with a server and/or other entities connected to the Internet. Similarly, local access can be provided using a local wireless network connection by a wireless network interface circuit using a local wireless antenna 130. A local wireless radio link 134 can connect the irrigation controller to a nearby device 132, such as a tablet computer, laptop computer, or cellular phone device. The local wireless radio link can be established in accordance with any one of several known short range wireless networking protocols, including those described in Specifications 802.11 and 802.15 of the Institute of Electrical and Electronics Engineers (IEEE), which include those protocols known as "WiFi" and "BlueTooth." Local wireless access allows groundskeepers, residents, and others to locally configure and operate the irrigation controller. Of course, as an alternative to a local wireless interface, a wired interface (e.g. Universal Serial Bus) can be used instead.

Figure 2:
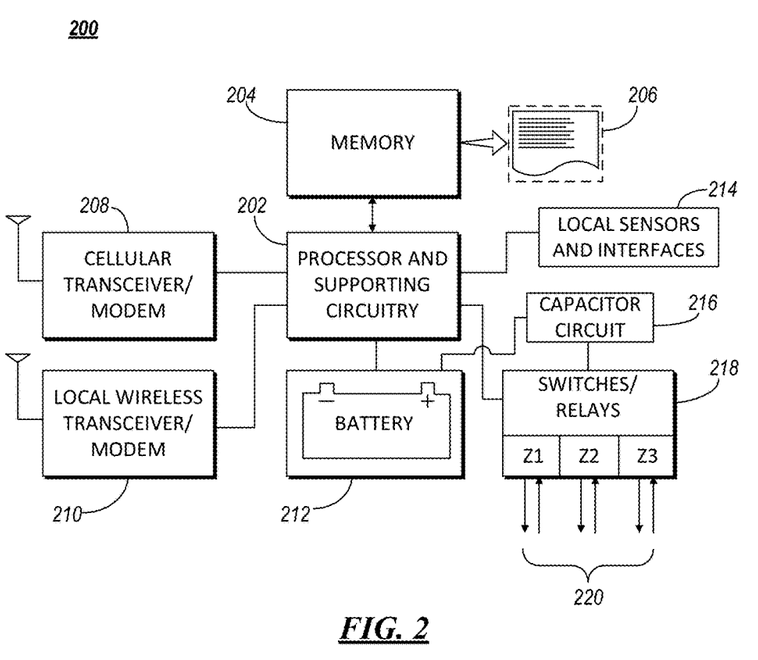
FIG. 2 is a block schematic diagram of a battery powered networked irrigation controller, in accordance with some embodiments.

FIG. 2 is a block schematic diagram of a battery powered networked irrigation controller 200, in accordance with some embodiments. Accordingly, the irrigation controller is connected to a battery 212 that provides power to the irrigation controller 200. The battery can be a primary or a secondary battery, depending on the application. By being battery powered, there is no need for a typical connection to commercial electric AC power, which greatly simplifies the deployment of irrigation controllers. In general, the irrigation controller 200 controls irrigation or sprinkling operation of one or more zones according to a program or schedule it receives via a radio network from a server. The irrigation controller 200 can be set to water once every several days, where the number of days is fixed, as a default. The server determines rainfall in the particular region where the irrigation controller 200 is located, and when rainfall occurs, it messages the irrigation controller 200 to shift its watering pattern so that the next watering day occurs that same several days after the last rainfall. That is, the watering schedule is agnostic with respect to dates, and instead ensures that there are no more than a selected maximum number of non-watering days between watering days, whether the watering occurs naturally (e.g. rain), or by the irrigation controller 200.

The irrigation controller 200 includes a processor unit 202 that comprises one or more microprocessors and supporting circuitry (e.g. frequency clock, time/date clock, voltage regulation, interface). The microprocessor unit is coupled to memory 204, which, as shown here, is an abstraction that can represent several different forms of memory in aggregate, which can include, for example, read only memory (ROM), random access memory (RAM), flash memory, and so on. Each different type of memory including in aggregate memory 204 is separately addressable by the one or more microprocessors in the microprocessor unit 202. The memory 204 includes at least one non-volatile memory unit and one RAM memory unit. The non-volatile memory unit can be used to store instruction code, records, files, and the like, including data acquired during operation, logs, and the like. In particular, a file 206 is maintained that indicates scheduled watering events, and the days on which they are to be carried out. The file 206 is a dynamically maintained data structure or record that changes and is updated as operations commence, and can indicate, among other information, the next day on which watering is to occur.

The instruction code stored in memory 204 is executed or performed by the one or more microprocessors in the microprocessor unit 202 to carry out functionality to be described herein, including control of zone valves, control of a main valve, communications with a remote server, communications with a locally connected device, and so on.

To facilitate communications with a remote server (or other similar remote equipment), the irrigation controller 200 includes a wide area radio network transceiver such as a cellular transceiver modem 208. The cellular transceiver modem 208, or simply cellular modem, can access a cellular telephony network using a known air interface such as the LTE air interface to engage in data communications with a remote server. The remote server (not shown) determines whether rainfall has occurred at the location of the irrigation controller, and can command the irrigation controller to shift its watering program when rainfall has occurred.

To conserve battery charge, the cellular transceiver modem is maintained in an off state by the microprocessor unit 202 until, according to its time/date clock, and turned on when it is time to commence watering, or just prior to commencing watering. Once turned on the irrigation controller uses the cellular transceiver modem 208 to communicate with the remote server. In the communication the irrigation controller 200 can communicate any information it may have, such as battery status (e.g. charge state, any faults, recharge cycles), programming changes made locally, maintenance activity, and so on. The remote server, in response to the communication, can send information regarding whether the irrigation controller 200 is to commence watering as scheduled, or to shift the schedule due to recent or predicted rainfall (e.g. to occur later the same day). If the server indicates no rainfall has occurred since the last watering, the irrigation controller will then commence its scheduled watering program. Otherwise, the irrigation controller will not commence watering and instead select the next day to commence watering based on the recency of the rainfall and the number of non-watering days set to pass between watering days. Once communication is completed, the cellular transceiver modem is turned off again until the next scheduled watering event.

Similarly, the irrigation controller 200 can include a local wireless transceiver 210 to facilitate local access, and which can operate using any of the known low power, short range wireless networking protocols, such as those described in specifications IEEE 802.11 or IEEE 802.15. Local access allows people (e.g. maintenance personnel) to adjust or control operation of the irrigation controller 200 while present in the vicinity of the irrigation controller 200 in order to conduct maintenance operations, tests, reconfiguration, and so on. A handheld device such as a tablet or mobile phone device can run an application program using a similar short range wireless network transceiver to connect with the irrigation controller 200 via the local wireless transceiver 210, and input and export information, including schedule changes, as well as override present schedules to conduct the maintenance operations.

The irrigation controller further includes a battery 212 that is used to power, exclusively, the irrigation controller 200 and circuitry associated circuitry. The battery 212 can represent one or more battery cells organized in any of several configurations. The battery 212 can be a rechargeable battery or a primary battery, and when the battery 212 is a rechargeable battery the battery 212 can be recharged by, for example, an external solar cell array and associated charge regulation circuitry, as is well known.

The irrigation controller 200 can further include local sensors and interfaces 214. Local sensors can include, for example, a moisture sensor, a temperature sensor, a rain gauge, among other sensors for measuring conditions at the location of the irrigation controller 200 that are relevant to determining whether watering is needed. The data produced by such sensors, when used, can be used by the processor circuit 202 and software, as well as being reported to a remote server via the cellular transceiver 208. Local interfaces can include, for example, a universal serial bus (USB) connector to allow a wired connection to the irrigation controller 200 in lieu of, or in addition to, the local wireless transceiver 210 being present.

The irrigation controller 200 provides watering by scheduled operation of valves which allow water to flow through the piping and water distribution devices (e.g. sprinkler heads). Typically there can be a main valve, as well as several zone valves. Each valve is operated by a switch or relay of a set of switches 218. Here, three switches are shown, one for each of zones Z1, Z2, Z3. The switches each provide a current pulse to a solenoid of their respective valve that controls opening and closing of the valve over respective electrical wiring lines 220. The current is sourced from the battery 212, and the valves operate by switching state (open or closed) in response to a current pulse, which obviates the need for a continuous flow of current to maintain the valve open. To avoid a condition where a valve is opened, and the battery then becomes depleted while the valve is open, and unable to source enough current to shut off the valve, a capacitor circuit 216 is used to store charge sufficient to ensure that the valves can be closed. Given that the battery would have to be in a very low charge state for this to occur, the irrigation controller 200 will report the low battery charge state to the remote server upon waking up the cellular transceiver modem 208 to check in with the remote server and verify that it is time to commence watering.

Figure 3:
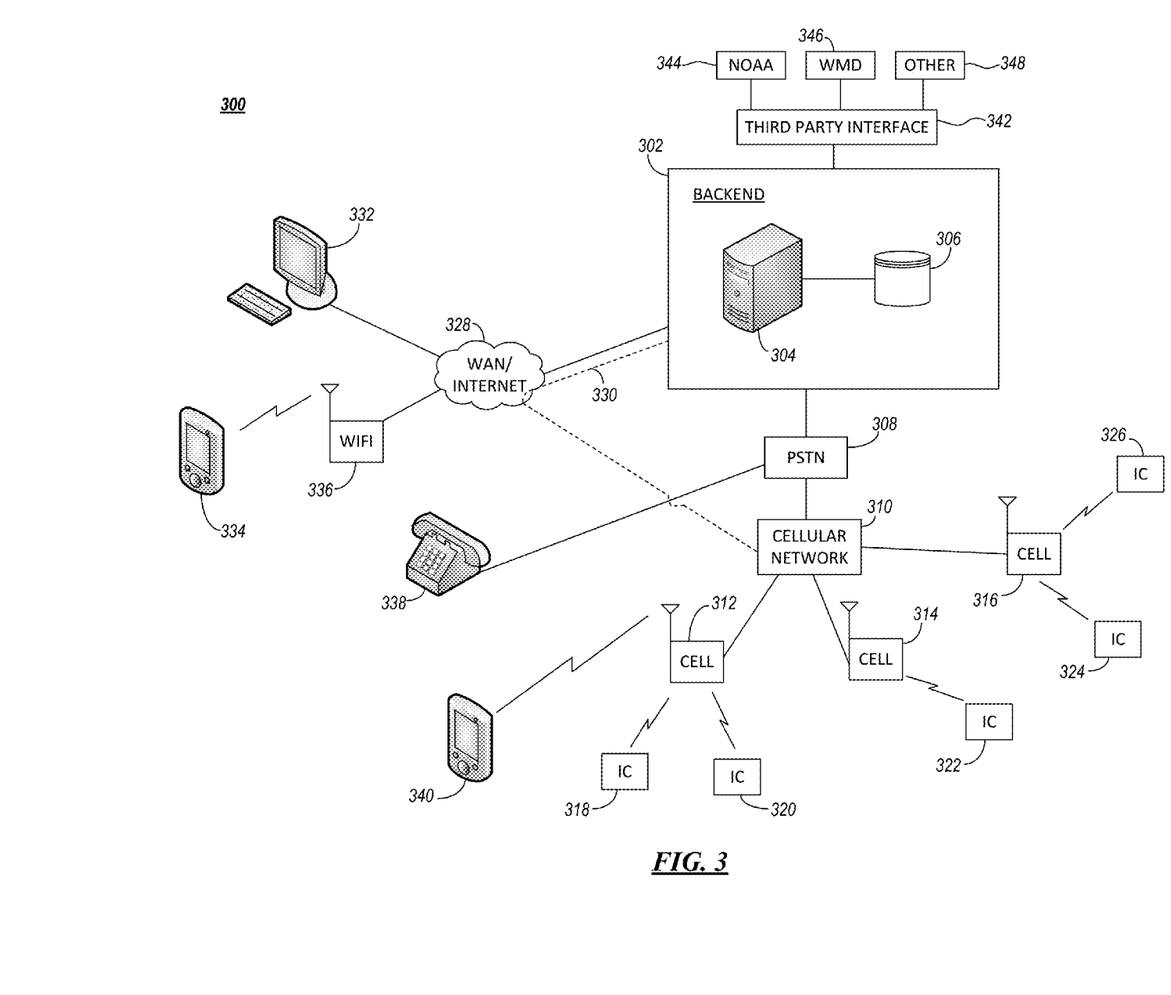
FIG. 3 is a system diagram of a networked irrigation system, in accordance with some embodiments.

FIG. 3 is a system diagram of a networked irrigation system 300, in accordance with some embodiments. The networked irrigation system 300 links deployed irrigation controllers (e.g. irrigation controllers 318, 320, 322, 324, 326) and other devices with a backend server 302 to facilitate moderating the operation of irrigation controllers 318-326 based on weather and user input. Each irrigation controller 318-326 can be designed in accordance with irrigation controller 200 of FIG. 2. Accordingly, the backend server 302 includes one or more server computers 304 that are coupled to one or more data stores 306. The server computers 304 run software that allows users to configure the desired operation of each deployed irrigation controller 318-326, and moderates their operation based on input received regarding rainfall at the locations of each irrigation controller 318-326. The backend server 302 maintains information in the data store 306 for each irrigation controller 318-326 (e.g. schedule 206 of FIG. 2), including its location (e.g. in latitude and longitude coordinates), the number of zones, and watering schedule (e.g. which days, and duration), among other information.

The backend server 302 can be connected with the irrigation controllers 318-326 over a network infrastructure, such as by using data communications over a public switched telephone network (PSTN) 308 coupled to a cellular network 310. The cellular network includes a plurality of cellular base stations 312, 314, 316. Each base station establishes a "cell" around it to facilitate radio communication according to a standardized signaling and radio protocol, as is well known. Alternatively, the backend server 302 can connect to the cellular network 310 via a wide area network 328, such as the internet, via a data link 330. The data link 330 can be a session established according to transfer control protocol (TCP) and internet protocol (IP) standards. The data link 330 can be established as a virtual private network (VPN) for security purposes. Those skilled in the art will appreciate that the backend server 302 can be connected to several cellular networks like cellular network 310, and provide substantially equivalent service across other cellular networks. In fact the choice of cellular network is driven by the irrigation controllers 318-326, and depends on which cellular network the irrigation controller is subscribed.

Each irrigation controller 318-326, having a cellular transceiver operated as described in accordance with FIG. 2, individually connects to the backend server 302 through the cellular network 310 and any intermediate network or other communication system between the cellular network 310 and the backend server 302. In normal operation, when it is time to commence watering, according to the schedule maintained locally at each irrigation controller 318-326, the irrigation controllers 318-326 will wake up their respective cellular transceiver modems and connect to the backend server 302 to report any status updates or changes, and to verify that watering is to be performed as scheduled, and if not (e.g. due to rainfall) then the next day on which watering is to commence.

To interact with the backend server 302, such as to set up or modify accounts, create or modify records for individual irrigation controllers, and see operational history of irrigation controllers, among other things, various client devices such as a computer 332, mobile devices 334, 340, or a telephone 338 can be used to connect to the backend server 302. The computer 332 can connect using the wide area network 328. The computer 332 can be served web pages generated by the backend server 302 that are viewable using a web browser such as those known by the trade names Firefox, Chrome, Internet Explorer, Opera, and so on. The web pages can be in a markup language such as hypertext markup language (HTML), which is rendered locally by the browser at the computer 332. Similarly, mobile devices 334, 340 can use browser applications designed for mobile devices. Mobile device 334 is shown connecting via a WiFi access point 336, which is connected to the wide area network/Internet 328. Mobile device 340 is shown using a data channel of a cellular base station 312 in the same way as each of the cellular transceivers of the irrigation controllers 318-326 to connect to the backend server 302. However, mobile device 340 uses a browser to access a customer or client-facing portal or page served by the backend server 302 using a specific URL, like the computer 332 and mobile device 334, whereas the irrigation controllers 318-326 can access the backend server 302 using different URLs that interface with applications being run by the backend server 302 which are not optimized for human viewing, but rather optimized for data communication between machines.

A voice line phone access modality can be supported to allow users to access the backend server 310 using a touch tone telephone 338. By calling a specific phone number for the backend server 302, a user can reach a voice interface where the backend server 302 presents a voice menu that allows the user to select from one or more options to navigate through a set of nested voice menus, as is well known. As with using a web browser on computer 332, or mobile devices 334, 340, a user can check on the status of a given irrigation controller, set up (provision), or delete an irrigation controller. For example, upon calling from the phone 338, the caller can be prompted to enter an account number using the touch tone buttons. The tones produced by the phone 338 are decoded by a voice interface application of the backend server 302 to access the corresponding account information. Each account can include one or more irrigation controllers that each have their own unique identifier. By entering the identifier of an irrigation controller the caller can access a voice menu that allows the caller to provision the irrigation controller, such as by selecting a default number of days between watering, and adjusting each zone operated by the irrigation controller to, for example, water normally, water more often than normally for a number of days (e.g. when sod is placed in the zone), suspend watering in a zone for a number of days, and so on.

In addition to the computer 332, mobile devices, 334, 340, and telephone 338, other modalities of accessing the backend server 302 can be operated equivalently. Each of these access modalities facilitate access to the user's account information, as well as interfaces that allow for setting up and controlling the operation of the user's irrigation controllers, obviating the need to dispatch personnel to each irrigation controller and access the irrigation controller directly. The information and settings established by users upon accessing interfaces presented by the backend server 302 are stored by the backend server 302, such as in data sore 306, in association with a record for each irrigation controller. When the irrigation controllers 318-326 contact the backend server 302, the backend server 302 can respond with updated settings information to modify operation of an irrigation controller if the user/owner of the irrigation controller has provided updated information. Furthermore, the historical operation of each irrigation controller, including any alert messages and other status events, can be presented to users by the backend server 302 in appropriate interfaces provided by the backend server 302.

One of the operations of the irrigation controllers 318-326 that can be adjusted is scheduled watering days. The backend server 302 uses an interface 342 to access weather resources, such as the National Oceanic and Atmospheric Administration (NOAA) 344, an open weather site such as WMD-Weather 346, or other 348 resources with weather information. The weather information for each of these sites 344, 346, 348 indicates historical as well as predicted rainfall information for specific geographic locations. Each day the backend server 302 can access these resources to determine if rain has fallen (and the amount of precipitation), or is predicted to fall, at the locations for each irrigation controller 318-326. When there has been a sufficient amount of rainfall at the location of an irrigation controller, when that irrigation controller is ready to commence a scheduled watering and checks in with the backend server 302, the backend server 302 will respond with a message indicating that the irrigation controller is to not water, and shift its watering schedule by an appropriate number of days, based on the recency of the rainfall. In response, the irrigation controller will not commence watering normally (but may commence special watering, such as for zones with recently laid sod), and will shift its normal watering schedule by the indicated number of days. This means that the irrigation controller never reverts to the previous schedule as it would have been but for the rainfall, and commences operation under the shifted schedule until and unless it is again shifted due to rainfall. When the irrigation controller's watering schedule is shifted due to predicted rainfall to occur on a day of scheduled watering, i.e. rainfall that hasn't yet happened when the irrigation controller checks in with the backend server 302, the watering schedule of the irrigation controller can be shifted by one day so that, on the next day the irrigation controller can check in with the backend server in case the predicted rainfall did not occur, and watering can be commenced, and thereafter the irrigation controller operates according to the shifted schedule which has been shifted by one day.

Figure 4:
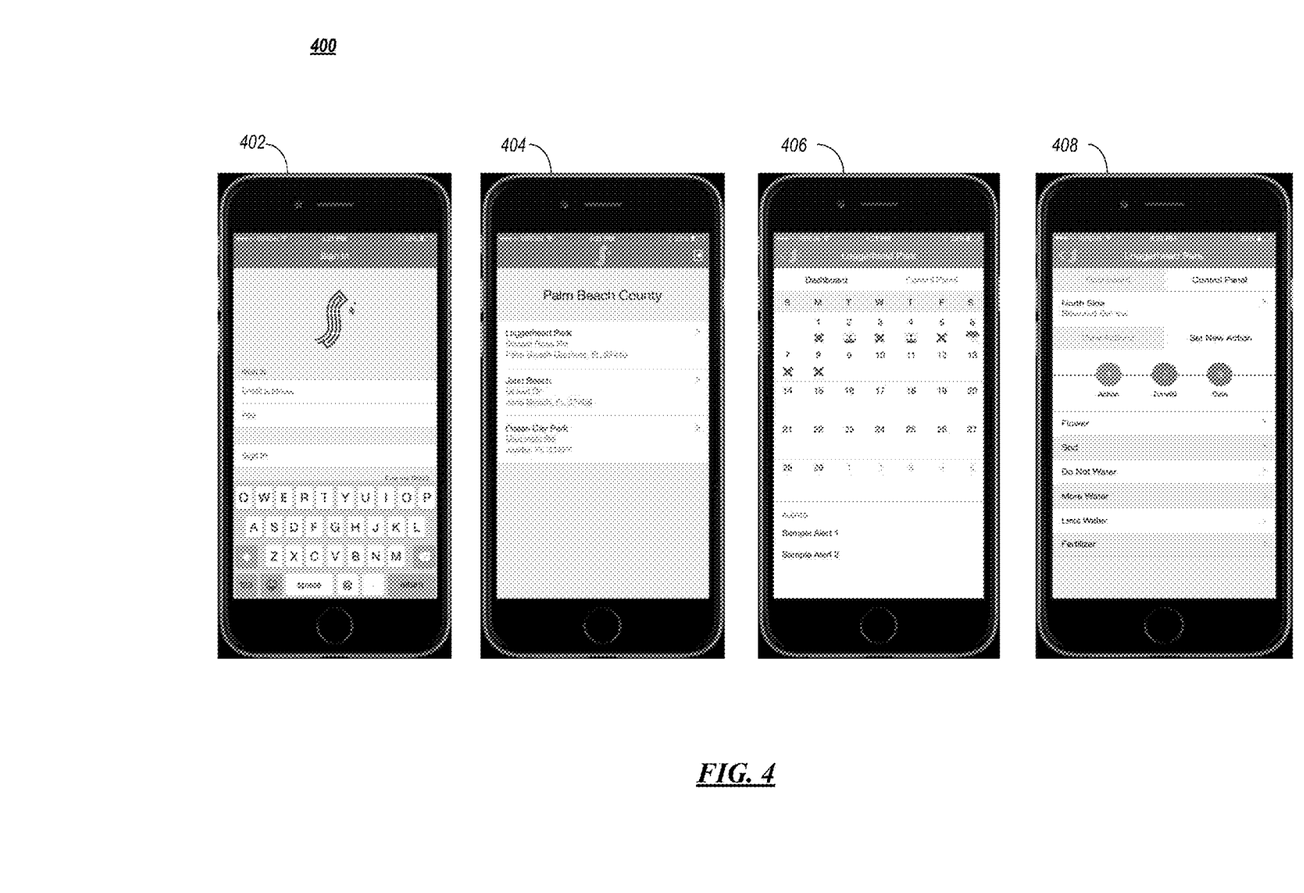
FIG. 4 is sequence diagram of an interface sequence operated on a mobile device for interfacing and controlling operation of one or more battery powered networked irrigation controllers, in accordance with some embodiments.

FIG. 4 is sequence diagram of an interface sequence 400 operated on a mobile device for interfacing and controlling operation of one or more battery powered networked irrigation controllers, in accordance with some embodiments. The mobile device illustrated here can be substantially similar to mobile devices 334, 340 of FIG. 3, and is used by a person to log into an account 402, view and interact with account information 404, see historical operation information 406, and utilize a provisioning interface 408 for an irrigation controller. The mobile device can use a commercially available browser application program or a similar proprietary application to access the information that is served by a backend server. The backend server maintains information for each account and irrigation controller, and responds to requests and makes changes in accordance with user input.

In the log in screen in interface 402 the mobile device is served an interface that prompts the user to input authentication information such as a user name, email address, and a personal identification number (PJN) or password. Once entered, the log in information is transmitted to the backend server for authentication. Interface 404 shows an example of a web page that can be served in response to a successful log in, and show the names of several locations where the user has set up irrigation systems using irrigation controllers (e.g. such as irrigation controller 200). Each of these locations can be clickable, and when clicked (or tapped), a new page specific to the clicked location can be served. Interface 406 shows historical operational information in a calendar format for a specific location, which can also be for a specific irrigation controller location. In the example shown, the user in interface 404 has selected "Loggerhead Park," and in interface 406 a calendar for Loggerhead park is shown. In the calendar days when watering occurred as scheduled can be indicated by, for example, a sprinkler icon, such as on the $2^{nd}$ and $4^{th}$ days. Days where no watering occurred can be indicated with an "X" such as on the $1^{st}$, $3^{rd}$, $5^{th}$, $7^{th}$, and $8^{th}$ days. Days on which rainfall occurred can be indicated by a raincloud icon, such as on the $6^{th}$ day. Alert messages can be indicated or listed below the calendar (e.g. under "Alerts"), which each alert title being a hyperlink to an alert message interface, showing a message or messages regard the account, or some operational information regarding one or more irrigation controllers.

In interface 408, a page for provisioning a specific irrigation controller is shown rendered on the display of the mobile device. Several options for special watering operations are provided, such as "flower," "sod," "do not water," "more water," "less water," and "fertilizer." "Flower" can refer to an instance where landscape plants in a zone are flowering, and may need to be dry or go without water for several days, thus selecting that option will cause the irrigation controller to avoid watering in the selected zone(s) for a preselected number of days. "Sod" can refer to an instance where new grass sod has been laid in a zone, and needs to be well watered for several days in a row to allow the sod to become established. Accordingly, selecting the "sod" option causes the irrigation controller to water the indicated zone every day for a preselected number of days. The "do not water" option can cause the irrigation controller to skip watering for the selected zone(s). The "more water" and "less water" options can cause the irrigation controller to water longer or less on the days when watering occurs for the respective zones. The "fertilizer" option can be used when fertilizer is put down on landscaping, and watering is needed for that zone for one day, in addition to watering on other scheduled days.

In general, when the user selects an option and provides input, any changes to be made are stored at the backend server and formatted into a message that is relayed to the specific irrigation controller when the irrigation controller checks in prior to commencing a scheduled watering event. Those skilled in the art will appreciate that numerous variations in the specific design of interfaces can be produced which can all accomplish substantially similar functions.

Figure 5:
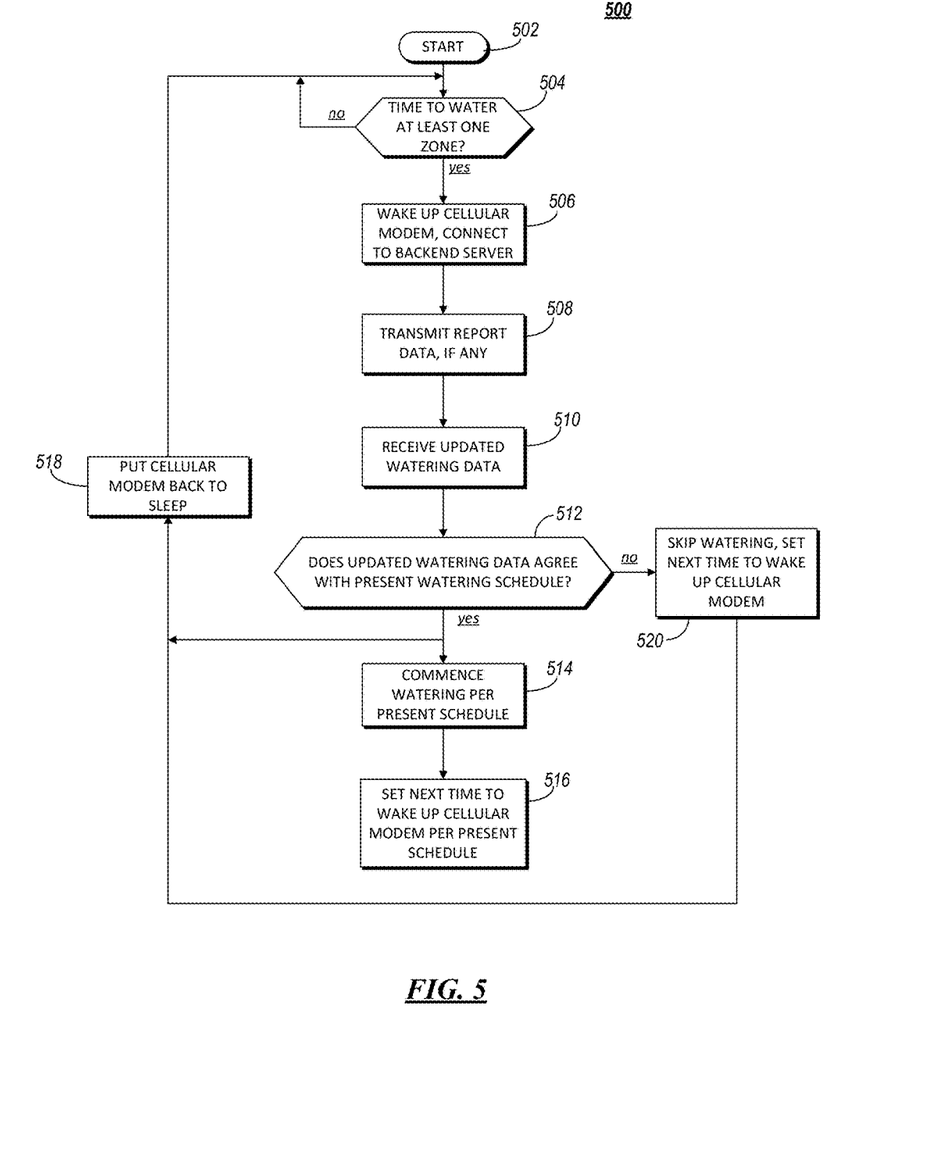
FIG. 5 is a flow chart diagram for a method of operating a battery powered networked irrigation controller, in accordance with some embodiments.

FIG. 5 is a flow chart diagram for a method 500 of operating a battery powered networked irrigation controller, in accordance with some embodiments. The method can be performed by an irrigation controller designed in accordance with irrigation controller 200 of FIG. 2. At the start 502, the irrigation controller is operating its processing unit, but the cellular transceiver modem is in a powered off or down state, consuming very little, if any, battery charge. The processing unit maintains a time of day and date clock, and there is a schedule record stored in a memory or data store of the irrigation controller. The schedule indicates the day and time of day at which the irrigation controller is to next commence watering, as well as the duration of watering (e.g. in minutes). The watering can be the same for all zones of the irrigation controller, or one or more zones may be watered while others are not, depending on whether there are any special circumstances for any of the zones, such as sod being laid, fertilizing, or flowering occurring in a zone or zones, which are reflected by input made by a user of the networked irrigation system for the specific irrigation controller. In step 504 the processing unit determines whether it is time to commence watering as indicated by the locally maintained schedule. The process of step 504 is shown as a loop, but it can be implemented in any of several ways, including as a background process that interrupts the processor when the scheduled time has been reached.

Once the time to commence watering has been reached, the method 500 proceeds to step 506 where the processing unit of the irrigation controller wakes up the cellular transceiver modem, and uses it to connect to the backend server. As previously described, the backend server can be reached using a unique URL that includes the domain of the backend server. Once a session with the backend server is established, the irrigation controller can transmit any status or other information it may have in step 508, such as, for example, a low battery alert, an indication that the irrigation controller was operated under local control (e.g. by maintenance personnel), and so on. This information, if provided, is stored by the backend server in association with the record for the irrigation controller so that alert messages and other information can be sent to the administrator or other supervisory authority of the irrigation controller. In some cases the information is merely kept for display the next time a user logs in to check on the system, and in more urgent cases, such as when there is a low battery alert, the backend server can generate a text message or email so that timely action can be taken.

In step 510 the backend server transmits any updates or changes to the watering schedule, including those that may inhibit watering that was scheduled to commence after this communication with the backend server. While the irrigation controller maintains its cellular transceiver modem in the powered off state for several days, rain may occur at the location of the irrigation controller, which will be determined by the backend server based on rainfall information from weather sources (e.g. NOAA, WMD). Thus, when rainfall has occurred, or is predicted to occur on the day of the communication, the backend server indicates a number of days that the irrigation controller is to shift its watering pattern. So, for example, if the watering pattern is to water once every three days, and it rained the day before at the location of the irrigation controller, the message from the backend server will be such that the irrigation controller will not water on the present day, and shift its watering pattern/schedule by two days. In general, if the irrigation controller commences normal watering every "n" days, where n is 2 or more, then the watering pattern is shifted by "n–r" days, where "r" is the number of days since the most recent rainfall at the location of the irrigation controller. Of course, when special watering in one or more zones of the irrigation controller is set to occur, such as to water every day in a zone where sod was recently laid, then watering will commence in those zones, but the normal daily watering pattern will be shifted so that either rain or watering occurs once every n days. Accordingly, in step 512, the irrigation controller evaluates any message received from the backend server to determine whether it is to commence with the scheduled watering according to the schedule it has, or whether it is to not water and shift the schedule by a number of days (1 to n–1 days).

When the backend server responds with a message as a result of recent rainfall, the method 500 proceeds to step 520 where the irrigation controller does not perform a general watering (special watering such as for a recently sodded zone can still occur), and the irrigation controller shifts its normal watering pattern/schedule by a number of days based on the message from the backend server received in step 510. If no special daily watering (e.g. for new sod) is to be commenced, then steps 506-510 are only carried out once every n days. Then in step 520 the currently scheduled general watering (i.e. that triggered the 'yes" path out of step 504) is inhibited and the general watering schedule or pattern is shifted by n–r days. If watering is occurring daily, or more frequently than the general watering period, for one or more zones, then steps 506-510 can be carried out each of those days as well. For example, if rainfall is predicted to occur on a day on which watering is scheduled to occur, for special or general watering, the irrigation controller can inhibit watering for the present day, and can perform steps 506-510 the next day in case the predicted rainfall did not occur on the prior day as predicted. The method 500 then proceeds from step 520 to step 518 where the cellular transceiver modem is placed back into the off or low power state.

When, in step 512, no rainfall has occurred since the last watering, the method 500 proceeds to step 514 and the irrigation controller commences watering as scheduled. Prior to commencing watering in step 514, however, the irrigation controller can also proceed to step 518 to place the cellular transceiver modem back into the low power/off state. In step 516 the irrigation controller sets the next scheduled watering, which can be a next general watering or the start of a special water schedule for one or more zones, based on information received in step 510. Steps 514 and 516 can be reversed or performed concurrently, and once both are completed the method will resume at step 504 the next day.

Method 500 as exemplified here gives an overview of the principles of operation of the irrigation controller, based on information is receives from the backend server. Special watering events aside, the irrigation controller will be programmed or set to water every several days. Prior to starting watering on a scheduled watering day, the irrigation controller powers up its cellular transceiver mode to communicate with the backend server, which monitors rainfall at the location of the irrigation controller. If rainfall has occurred on a day since the last time the irrigation controller carried out a general watering, the backend server informs the irrigation controller to shift its general watering schedule by a number of days so that the general watering or rain fall occurs every n days, so that watering does not occur more than once every n days. In this way water is not wasted, and natural rainfall supplements irrigation. In the event that, upon attempting to contact the backend server, the irrigation controller is unable to make contact (within a preselected number of attempts or over a preselected time period), it can default to a conventional watering schedule of performing a general watering every three days until and unless it is able to again make contact with the backend server. In some embodiments the irrigation controller can attempt to connect with the backend server at regular periods that occur more frequently than that at which the general watering is to occur (e.g. every day).

Figure 6:
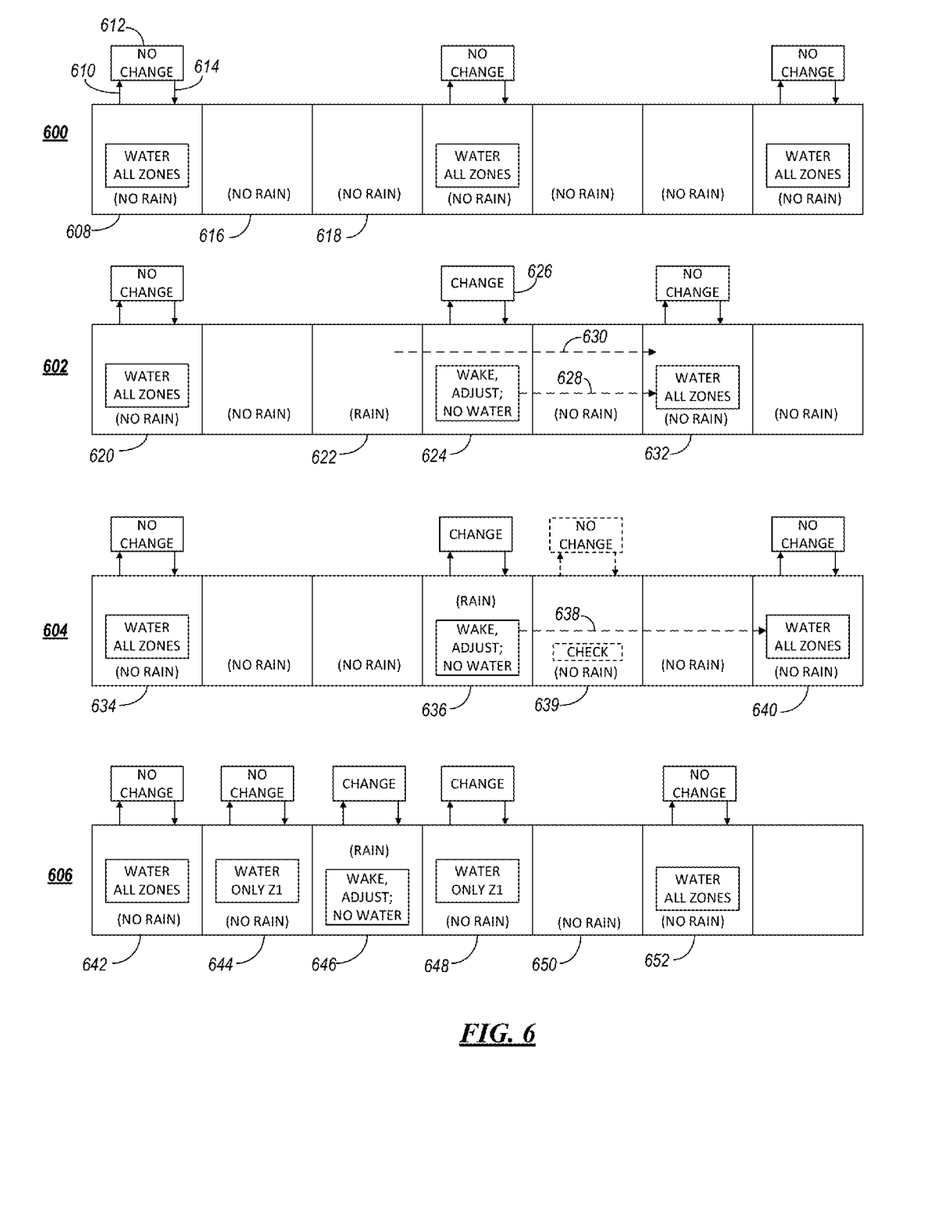
FIG. 6 is a scenario diagram showing several exemplary modes of operation of a battery powered networked irrigation controller, in accordance with some embodiments.

FIG. 6 is a scenario diagram showing several exemplary modes of operation of a battery powered networked irrigation controller, in accordance with some embodiments. The irrigation controller is designed in accordance with irrigation controller 200 of FIG. 2, and performs a method equivalent to method 500 of FIG. 5. Scenarios 600, 602, 604, and 606 each assume that the irrigation controller is set, scheduled, or otherwise programmed to commence general watering every third day, starting on the first day in each scenario, and each scenario shows seven days of operation.

Scenario 600 shows operation when no rainfall occurs for the seven days. On the first day, day 608, watering is scheduled to occur, so the irrigation controller powers up the cellular transceiver modem and contacts the backend server, indicated by line 610 (and all similar outgoing lines here-after in FIG. 6). Since there has been no rain, the backend server formulates a message 612 that indicates no change to the schedule is to be made. The backend server then transmits the message 612 to the irrigation controller as indicated by line 614 (all incoming lines like 614 indicate messages transmitted to the irrigation controller in FIG. 6). Once the message is received the cellular transceiver can be shut off and watering is commenced in all zones. On days 616 and 618, no rain falls at the location of the irrigation controller. Since no rain occurs in scenario 600 then, this pattern is repeated every three days. Thus, the day after day 618 a general watering occurs, and again three days later in the last day of scenario 600.

Scenario 602 illustrates how the general watering schedule is shifted due to rainfall. On day 620, like on day 608 of scenario 600, a general watering occurs for all zones. However, on day 622 rain falls at the location of the irrigation controller. Accordingly, on day 624, the backend server formulates a message 626 that indicates a change is to be made. In response to message 626, the irrigation controller does not perform a watering (as indicated by "no water"). Since the rain fell on day 622, one day before the scheduled watering, the watering schedule is shifted to the third day after the rainfall, as indicated by line 630. Thus, the irrigation controller shifts the general watering schedule by two days, as indicated by line 628, to day 632. Assuming no rain falls on day 624 or the day between day 624 and day 632, the irrigation controller will perform a general watering upon receiving a message from the backend server indicating no change to the schedule, and the schedule will repeat again in three days (which is beyond the end of scenario 602).

Scenario 604 shows operation when rainfall is predicted to occur on a day on which watering is scheduled to occur. On day 634 a normal watering occurs, as on day 608 of scenario 600. No rain falls on the subsequent two days after day 634. On day 636, the third day after day 634, prior to the scheduled watering the irrigation controller powers up its cellular transceiver modem to communicate with the backend server. Since rain is predicted to fall on day 636 at the location of the irrigation controller, the backend server formulates a change message on the assumption that the predicted rain will fall, obviating the need to water. Accordingly, the next scheduled watering is then shifted to day 640, which would have been a scheduled watering day without any rain, as in scenario 600. However, the irrigation controller can, on day 639, check in with the backend server to verify that the predicted rain did in fact occur. If the predicted rainfall did occur, then the irrigation controller does not water and will not wake up its cellular transceiver modem again until day 640 when the next scheduled watering is to occur. If the predicted rain did not occur on day 636, then the backend server on day 639 would inform the irrigation controller to perform a general watering, and shift the watering schedule so that the next scheduled general watering occurs the day after day 640.

Scenario 606 shows special watering procedures along with general watering. Specifically, on days 642 and 648 a general watering is scheduled to occur, and on days 644 and 646 special watering for zone 1 is to occur in addition to being watered on the general watering days 642, 648. The special watering days can be set up by a message from the backend server on a day prior to day 642 (or on any day on which any watering is scheduled to occur). On day 642 a general watering of all zones is commenced, and no change is indicated in the communication with the backend server. On day 644 only zone 1 is scheduled to be watered. After communicating with the backend server the irrigation controller receives a message indicating there is no change, so zone 1 (and only zone 1) is watered on day 644. Again on day 646 zone 1 is scheduled to be watered. However, on day 646 rain is predicted to fall at the irrigation controller, and accordingly the backend server indicates a change to not perform any watering. On day 648, zone 1 is again scheduled to be watered, and the other zones would also be watered if no rain fell on day 646 as predicted. Thus, when the irrigation controller communicates with the backend server on day 648, and the predicted rainfall did occur on day 646 (and no rain is predicted on day 648), the message from the backend server is such that the irrigation controller waters only zone 1 on day 648 and shifts the next scheduled general watering to three days after the last day on which rain fell (e.g. day 646) to day 652. Day 648 is the last scheduled special watering day, so no watering at all occurs on day 650. On day 652 a general watering occurs as there has been no rain for the previous two days.

Figure 7:
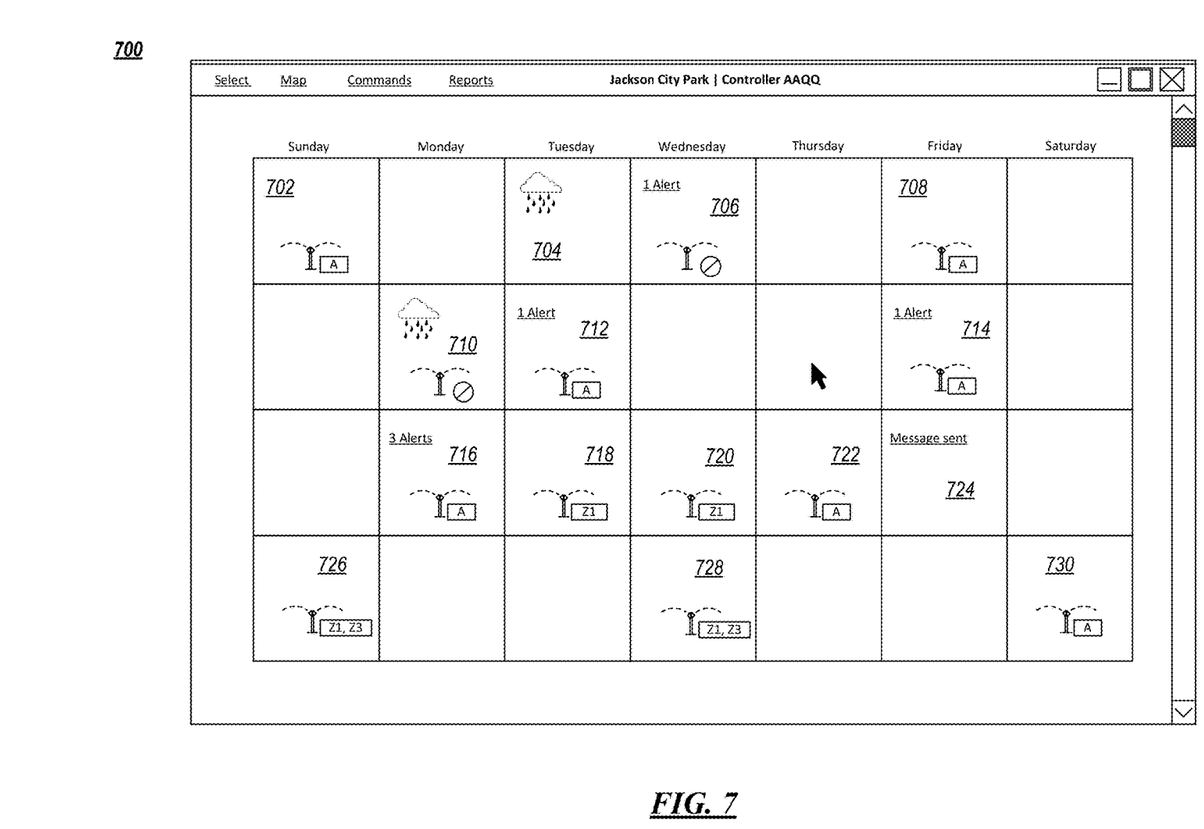
FIG. 7 is an interface diagram showing an month-view of historical operation of a battery powered networked irrigation controller, in accordance with some embodiments.

FIG. 7 is an interface diagram 700 showing a month-view of historical operation of a battery powered networked irrigation controller, in accordance with some embodiments. The diagram 700 can represent a window or tab of a browser that has to used to access a backend server from a computer on which the browser is instantiated. The window can show the account and specific irrigation controller at the top ("Jackson City Park|Controller AAQQ"), and present menu selections (e.g. "Select," "Map," "Commands," and "Reports."). The month is shown in a seven day week by four week format, starting on Sunday each week. General watering is set to occur every third day if no rain falls at the location of the irrigation controller. Again, the irrigation controller is designed in accordance with that of FIG. 2, and operates substantially in accordance with method 500.

On day 702 the irrigation controller was programmed or scheduled to perform a general watering, and was not changed or adjusted by the backend server. Accordingly, on the space representing day 702 a sprinkler icon is shown, with a "A" to indicate all zones were watered. On day 704 rain falls at the location of the irrigation controller.

Figure 8:
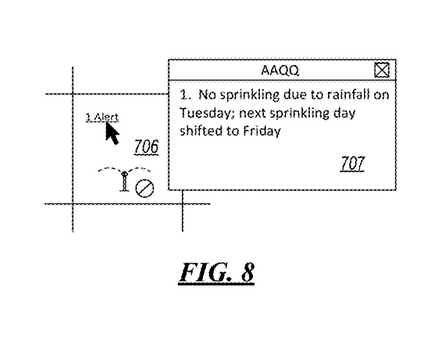
FIGS. 8-13 show various examples of alert messages and command interfaces for interacting with a networked irrigation system, in accordance with some embodiments.

On day 706 the irrigation controller was programmed to perform a general watering as a result of communicating with the backend server on day 702. However, because ran fell on day 704, when the irrigation controller communicates with the backend server prior to commencing watering on day 706, the irrigation controller receives a command from the backend server to not water on day 706, and set the next watering day to be day 708, which is three days after day 704 when it rained. To inform the user that this change occurred, an alert message is indicated with a hyperlink "1 Alert." FIG. 8 shows an example of what can be presented to the user upon clicking on the hyperlink, where an alert pop-up window 707 is presented with a message indicating that rain fell on the prior day and that the watering schedule has been shifted so that the next scheduled watering is Friday, which is three days after it rained on Tuesday.

Figure 9:
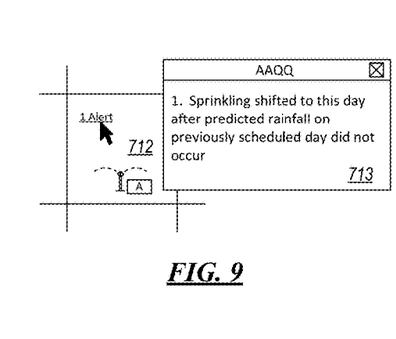

On day 710, which is the third day after day 708, the irrigation controller is set to perform a general watering. However, upon communicating with the backend server, because it is predicted to rain at the location of the irrigation controller, the backend server responds with a message to not water, and that the irrigation controller is to again communicate with the backend server the next day to verify that the predicted rainfall did occur. Thus, on day 710, the sprinkling icon is showed with a circle with a diagonal line through it, indicating no watering occurred. However, in the example, no rain actually fell on day 710. As a result, the next day, on day 712, when the irrigation controller communicated with the backend server again, it received a message to perform the general watering, and set the next general watering day for three days later, on day 714. The alert hyperlink on day 712, when clicked, is shown in FIG. 9, where pop-up window 713 is displayed with a message informing the user that watering occurred on this day because rain predicted for the prior day, which was a scheduled general watering day, did not occur.

Figure 10:
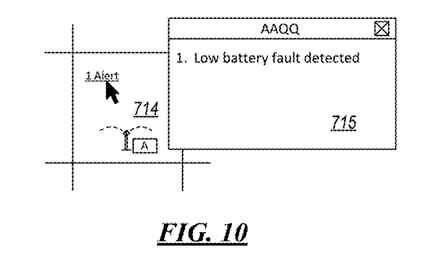

On day 714, which is three days after day 712, a general watering is set to occur. However, the irrigation controller detected a low battery charge condition. As a result, when the irrigation controller communicated with the backend server, it transmitted the low battery status, and in response the backend server generated an alert message for the user. The alert hyperlink on day 714, when clicked, is shown in FIG. 10, where a pop-up message 715 indicates the low battery condition. Additionally, because a low battery condition needs immediate attention, the backend server can be configured to send an email and/or a text message to one or people associated with the irrigation controller.

Figure 11:
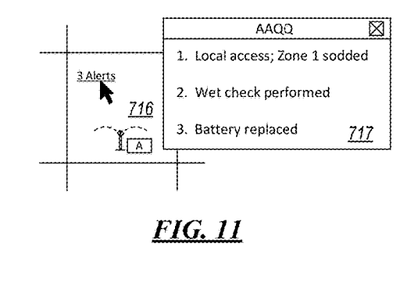

On day 716, which is the third day after day 714, with no rain falling between those days, a general watering is set to be performed. On this day there are three alert messages, as indicated by the alert hyperlink. Upon clicking the alert hyperlink on day 716, as shown in FIG. 11, a pop-up window 717 is displayed to the user. The alert messages indicate that zone 1 has been sodded, and this message was generated by local access at the irrigation controller (e.g. via a local wireless or wired interface of the irrigation controller). Furthermore, a wet check was performed to verify proper watering operation (e.g. sprinkler heads), and that the battery was replaced. The icons on days 712, 714, and 716 all indicate that all zones were watered. Since zone was sodded, on days 718, 720, special watering occurs where only zone 1 is watered, as indicated by "Z1" in the box next to the sprinkler icon. Day 722 is the third day after day 716, so the irrigation controller performed a general watering of all zones.

Figure 12:
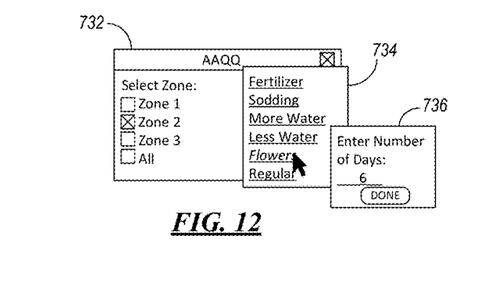

On day 724, the user used the interface to set up a change in watering, as shown in FIG. 12. A menu 732 allows the user to select one or more zones, and then to indicate what special watering type is to occur in box 734. In this example, the user has selected zone 2, and indicated that there is flowing occurring, and in box 736 the user indicates the number of days the special watering is to last (six days). As previously mentioned, for flowing plants, no watering is performed. Thus, on day 726, which is the third day after day 722, the irrigation controller, when it communicates with the backend server, receives a message indicating that no watering is to be performed in zone 2 for a period of six days. Thus, the icon on day 726 indicates watering was performed in zones 1 and 3, implying that no watering occurred in zone 2. Again on day 728, when a general watering would occur being the third day after day 726, only zones 1 and 3 are indicated as having been watered. On day 730, which is beyond the six days selected for zone 2, and which is the third day after day 728, a general watering of all zones is performed.

Figure 13:
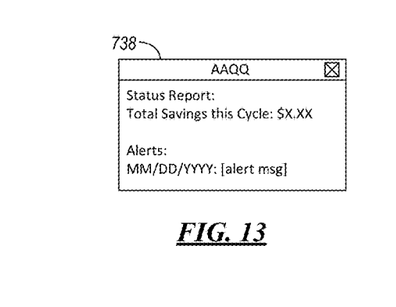

The user can also see a monthly status report 738, as indicated in FIG. 13, via one of the menus at the top of the window. In particular, the status report can indicate a monetary savings achieved by use of the inhibit and shift approach to scheduling watering in accordance with embodiments of the inventive irrigation controller and networked irrigation system. The report 738 can also present a summary of alert messages and the days on which they occurred, which can be hyperlinks that, when clicked, bring up pop-up boxes such as boxes 707, 713, 715, and 717.

Accordingly, the networked irrigation system and irrigation controllers provide the benefit of a rain responsive system that avoids watering when rainfall provides the desired watering, and ensures that watering does not occur more frequently than needed by shifting the days on which watering is to be performed, generally, in response to rainfall. Furthermore, by being battery powered, the irrigation controllers can be deployed easier and with less cost as no commercial electric power lines need to be installed and connected. By networking the irrigation controller using a cellular transceiver modem, operation of the irrigation controller can be administered automatically by a backend server in correspondence with settings provided by supervisory personnel. This obviates the need for personnel to travel to the irrigation controller to set up special watering conditions, and ensures that the irrigation controller reverts back to general watering when the special watering time has ended, again without having to dispatch personnel to the irrigation controller. The networking is facilitated by a cellular transceiver modem, which is kept powered off all the time except just prior to commencing watering, to communicate with the backend server to report any status information, and receive any changes in the watering schedule. Using the inventive networked irrigation system, in accordance with the embodiments disclosed herein, significantly reduces operating costs in water used, as well as personnel hours.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. A method for operating a battery powered irrigation unit including an irrigation controller and a cellular modem, the cellular modem having a sleep mode and an operating mode, the method comprising:
   maintaining the cellular modem in the sleep mode until occurrence of a watering time, wherein the watering time occurs by default every "n" days where "n" is at least 2;
   at each watering time waking the cellular modem from the sleep mode to the operating mode to communicate with a backend server via a cellular network;
   upon communicating with the backend server, receiving watering information and placing the cellular modem back into the sleep mode;
   determining, based on the watering information, whether to presently water, or to not water and shift the watering times; and
   responsive to determining whether to presently water, or to not water and shift the watering times, the irrigation controller then, accordingly commence:
   watering; or
   not watering and shifting the watering times by "n–r" days where "r" is the number of days since it last rained at a location of the battery powered irrigation controller, as determined by the backend server and as indicated in the watering information.

2. The method of claim 1, further comprising:
   upon attempting to communicate with the backend server, failing to establish communication and, in response, the irrigation controller watering and placing the cellular modem back into the sleep mode.

3. The method of claim 1, wherein "n" is at least 3.

4. The method of claim 1, further comprising:
   upon communicating with the backend server, transmitting to the backend server status information including a date when the battery powered irrigation unit last watered.

5. The method of claim 4, wherein the status information further includes at least one of a battery status, a zone status, a solenoid status, or a local override event.

6. The method of claim 1, wherein the battery powered irrigation unit controls watering in a plurality of zones, receiving watering information comprises receiving watering information for each zone of the plurality of zones.

7. The method of claim 1, wherein upon communicating, receiving watering information including a specific time of day to commence the watering.

8. A battery powered irrigation unit, comprising:
   a battery;
   a cellular modem powered by the battery and having a sleep mode and an operating mode,
   an irrigation controller powered by the battery and that is configured to:
      maintain the cellular modem in the sleep mode until occurrence of a watering time, wherein the watering time occurs by default every "n" days where "n" is at least 2;
      at each watering time wake the cellular modem from the sleep mode to the operating mode to attempt to communicate with a backend server via a cellular network, and responsive to communicating with the backend server, receive watering information from the backend server and place the cellular modem back into the sleep mode;
      responsive to, and based on the watering information received during the operating mode the irrigation controller is further configured to determine whether to either:
      water; or
      not water and shift the watering time by "n–r" days where "r" is the number of days since it last rained at a location of the battery powered irrigation controller, as determined by the backend server and as indicated in the watering information, and
      responsive to making the determination to either water, or not water and shift the watering time, the irrigation controller is further configured to either water, or not water and shift the watering time, accordingly.

9. The battery powered irrigation unit of claim 8, wherein the irrigation controller is further configured to, upon attempting to communicate with the backend server and failing to establish communication, water and place the cellular modem back into the sleep mode.

10. The battery powered irrigation unit of claim 8, wherein "n" is at least 3.

11. The battery powered irrigation unit of claim 8, wherein the irrigation controller is further configured to, upon communicating with the backend server, transmit to the backend server status information including a date when the battery powered irrigation unit last watered.

12. The battery powered irrigation unit of claim 11, wherein the status information further includes at least one of a battery status, a zone status, a solenoid status, or a local override event.

13. The battery powered irrigation unit of claim 8, wherein the battery powered irrigation unit controls watering in a plurality of zones, the watering information comprises watering information for each zone of the plurality of zones.

14. The battery powered irrigation unit of claim 8, wherein the watering information includes a specific time of day to water.

15. An irrigation system that waters on non-consecutive days and which skips watering at least one day after a rain event, the system comprising:
   a plurality of battery powered irrigation control units, each deployed in a respective region, each having a cellular transceiver modem, and each controller at least one watering zone;
   a backend server that administers each of the plurality of battery powered irrigation control units, and which further monitors rainfall at each location of the plurality of battery powered irrigation control units;
   each of the plurality of battery powered irrigation control units being configured to:
      maintain the cellular transceiver modem in the sleep mode until occurrence of a watering time, wherein the watering time occurs by default every "n" days where "n" is at least 2;
      at each watering time wake the cellular transceiver modem from the sleep mode to the operating mode to attempt to communicate with a backend server via a cellular network, and responsive to communicating with the backend server, receive watering information from the backend server and place the cellular modem back into the sleep mode;
      water when the watering information indicates that the irrigation controller is to water; and
      not water and shift the watering time by "n–r" days where "r" is the number of days since it last rained at a location of the battery powered irrigation controller, as determined by the backend server and as indicated in the watering information, when the watering information indicates that the irrigation controller is to not water and shift the watering time.

16. The irrigation system of claim 15, wherein "n" is at least 3.

17. The irrigation system of claim 15, wherein each battery powered irrigation control unit is further configured to, upon communicating with the backend server, transmit to the backend server status information including a date when the battery powered irrigation unit last watered.

18. The irrigation system of claim 17, wherein the status information further includes at least one of a battery status, a zone status, a solenoid status, or a local override event.

19. The irrigation system of claim 15, wherein each battery powered irrigation control unit controls watering in a plurality of zones, the watering information comprises watering information for each zone of the plurality of zones.

20. The irrigation system of claim 15, wherein the watering information includes a specific time of day to water.

* * * * *